US009878658B2

(12) United States Patent
Meyer-Wendt et al.

(10) Patent No.: US 9,878,658 B2
(45) Date of Patent: Jan. 30, 2018

(54) VEHICLE BRAKE LIGHTING

(71) Applicant: Federal-Mogul LLC, Southfield, MI (US)

(72) Inventors: Ralf Meyer-Wendt, Dublin, CA (US); Stephen Kowalchik, Dexter, MI (US)

(73) Assignee: FEDERAL-MOGUL LLC, Southfield, MI (US)

( * ) Notice: Subject to any disclaimer, the term of this patent is extended or adjusted under 35 U.S.C. 154(b) by 0 days.

(21) Appl. No.: 14/210,636

(22) Filed: Mar. 14, 2014

(65) Prior Publication Data

US 2014/0266667 A1 Sep. 18, 2014

Related U.S. Application Data

(60) Provisional application No. 61/794,478, filed on Mar. 15, 2013.

(51) Int. Cl.
*B60Q 1/44* (2006.01)

(52) U.S. Cl.
CPC ............. *B60Q 1/441* (2013.01); *B60Q 1/444* (2013.01); *B60Q 1/445* (2013.01); *B60Q 1/447* (2013.01)

(58) Field of Classification Search
CPC ........ B60Q 1/441; B60Q 1/444; B60Q 1/445; B60Q 1/447
USPC ....................................................... 340/479
See application file for complete search history.

(56) References Cited

U.S. PATENT DOCUMENTS

| | | | |
|---|---|---|---|
| 4,843,368 A | 6/1989 | Poulos | |
| 5,493,908 A | 2/1996 | Trolle | |
| 6,023,221 A | 2/2000 | Michelotti | |
| 6,133,852 A | 10/2000 | Tonkin | |
| 6,249,219 B1 | 6/2001 | Perez et al. | |
| 6,268,792 B1 | 7/2001 | Newton | |
| 6,351,211 B1 | 2/2002 | Bussard | |
| 6,400,308 B1 * | 6/2002 | Bell | B60Q 1/0023 340/901 |
| 6,411,204 B1 * | 6/2002 | Bloomfield | B60Q 1/302 340/464 |

(Continued)

FOREIGN PATENT DOCUMENTS

| | | |
|---|---|---|
| DE | 3907714 A1 | 9/1990 |
| EP | 2314477 A1 | 4/2011 |

(Continued)

OTHER PUBLICATIONS

International Search Report for application No. PCT/US2014/027135, dated Jul. 2, 2014, 3 pages.

(Continued)

*Primary Examiner* — Naomi Small
(74) *Attorney, Agent, or Firm* — Reising Ethington, P.C.

(57) ABSTRACT

A brake lamp module for a vehicle, wherein the module includes a housing, lamp device, sensor, and electronic control unit (ECU). The lamp device, sensor and ECU are carried by the housing. The ECU is configured based at least in part on data received from the sensor to provide a power signal that causes illumination of the lamp device. In at least some embodiments, this arrangement permits actuation of the brake lamp or other lamp device in response to detection of a hazard event, such as rapid deceleration of the vehicle. And, in at least some embodiments, this may be done independently of actuation of the brake pedal by the driver.

11 Claims, 2 Drawing Sheets

(56) References Cited

U.S. PATENT DOCUMENTS

| | | |
|---|---|---|
| 6,464,381 B2 | 10/2002 | Anderson, Jr. et al. |
| 6,693,442 B2 | 2/2004 | Karray et al. |
| 7,495,550 B2 | 2/2009 | Huang et al. |
| 7,677,774 B2 | 3/2010 | Ando |
| 7,834,751 B2 | 11/2010 | Tewari |
| 7,893,823 B2 | 2/2011 | Morales |
| 8,049,610 B2 | 11/2011 | Malik |
| 2002/0171542 A1 | 11/2002 | Bloomfield et al. |
| 2003/0043033 A1* | 3/2003 | Lee .................... B60Q 1/44 340/463 |
| 2003/0070987 A1* | 4/2003 | Martin ................ G03C 7/44 210/650 |
| 2004/0070987 A1* | 4/2004 | Iwaki ............ H05B 33/0809 362/487 |
| 2005/0237172 A1* | 10/2005 | Boomershine, III .... B60Q 1/44 340/467 |
| 2007/0241874 A1* | 10/2007 | Okpysh .............. B60Q 1/444 340/479 |
| 2007/0267900 A1* | 11/2007 | Hart ................... B62D 25/04 296/222 |
| 2008/0238648 A1* | 10/2008 | Tewari ............... B60Q 1/444 340/469 |
| 2008/0309478 A1 | 12/2008 | Morales |
| 2009/0134987 A1* | 5/2009 | Oltmann ............. B60Q 1/302 340/435 |
| 2009/0212935 A1 | 8/2009 | Luo |
| 2009/0261963 A1* | 10/2009 | Ault .................... B60Q 1/44 340/467 |
| 2012/0078466 A1 | 3/2012 | Natori et al. |

FOREIGN PATENT DOCUMENTS

| | | |
|---|---|---|
| GB | 2233843 | 1/1991 |
| GB | 2256098 A | 11/1992 |
| GB | 2415098 A | 12/2005 |
| GB | 2483130 A | 2/2012 |
| JP | 2000159009 A | 6/2000 |
| WO | WO2008007085 A2 | 1/2008 |
| WO | WO2009049332 A1 | 4/2009 |

OTHER PUBLICATIONS

Written Opinion for application No. PCT/US2014/027135, dated Jul. 2, 2014, 6 pages.
Japanese Office Action for Application No. 2016502345 dated Oct. 25, 2016, 3 pages.
Chinese Office Action for Application No. 201480016058.3 dated Jul. 22, 2016, 7 pages.
English Translation of Chinese Office Action for Application No. 201480016058.3 dated Jul. 22, 2016, 12 pages.
Korean Office Action for Application No. 10-2015-7027669 dated Jan. 18, 2017, 8 pages.
English Translation of Korean Office Action for Application No. 10-2015-7027669 dated Jan. 18, 2017, 8 pages.
European Search Report for Application No. 14767454.3 dated Dec. 12, 2016, 7 Pages.

* cited by examiner

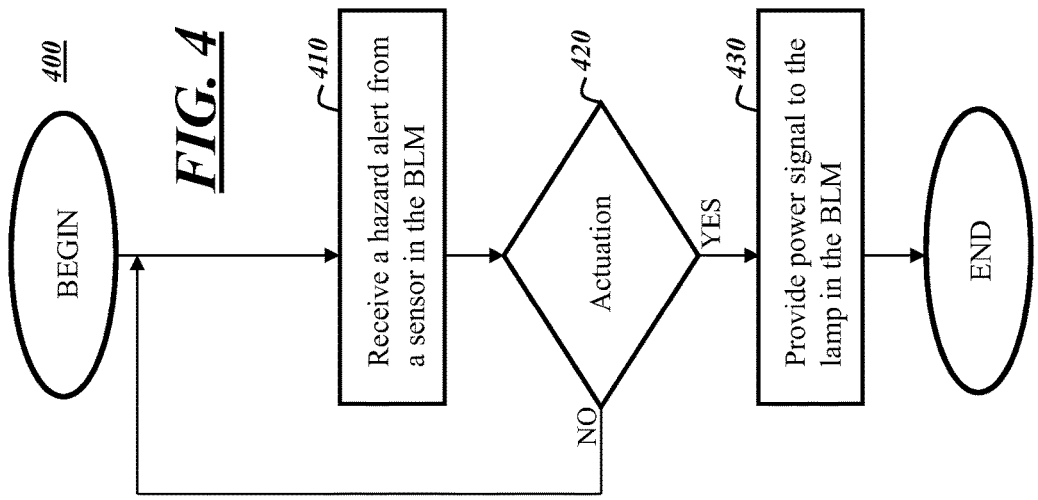
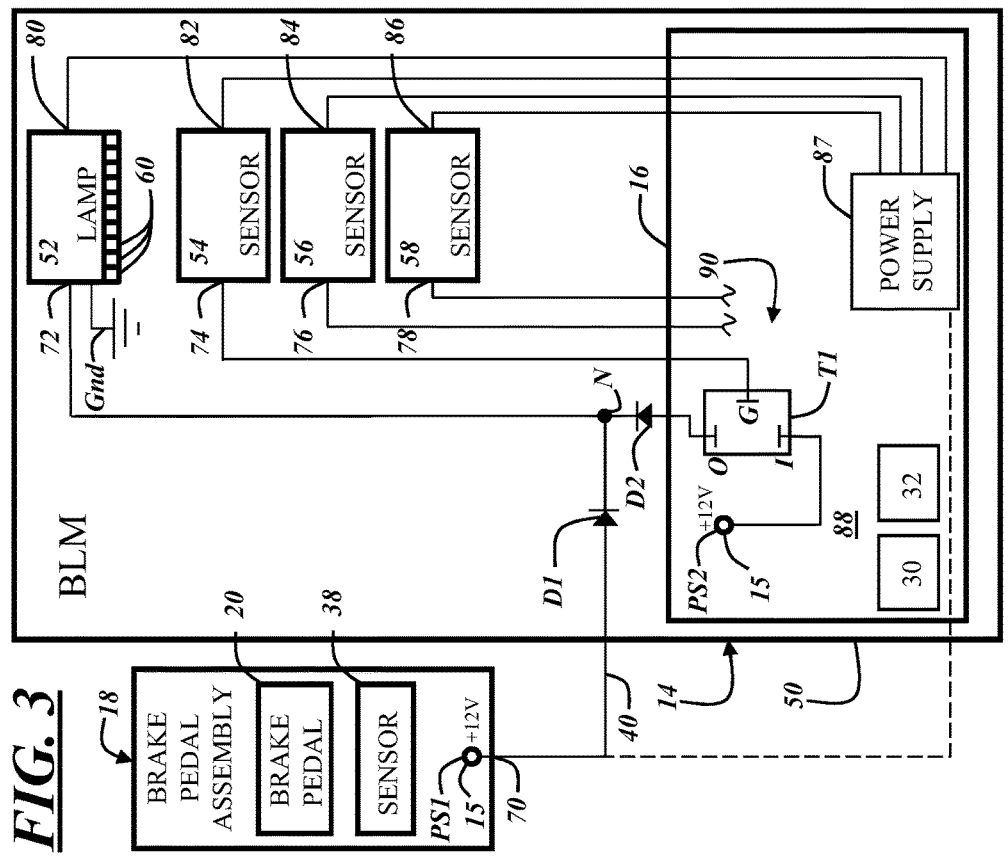

VEHICLE BRAKE LIGHTING

CROSS-REFERENCE TO RELATED APPLICATION

This application claims the benefit of U.S. Provisional Application No. 61/794,478, filed Mar. 15, 2013, the entire contents of which are hereby incorporated by reference.

TECHNICAL FIELD

This invention generally relates to exterior vehicle lighting and, in particular, to vehicle brake lighting.

BACKGROUND

Brake lights provides a visual indication to following vehicles of a deceleration of the leading vehicle, which is useful in helping to avoid vehicular accidents. A conventional brake light operation involves detection of braking by the vehicle driver (e.g., depression of the vehicle's brake pedal) and illumination of left and right brake lights on the rear of the vehicle, as well as that of a center high-mounted stop lamp (CHMSL).

It has been proposed to modify the illumination of the brake lights based on a sensed level of deceleration during a driver initiated braking event. WO 2009/049332 discloses a circuit that includes two accelerometers and a microcontroller used during driver braking to measure deceleration and tilt of a car and to determine if the car is undergoing emergency braking and, if so, to flash the brake lights rather than holding them constantly on during the braking. One disadvantage in such a system is that it is wholly dependent on driver braking to supply the operating power for the accelerometer circuit and cannot independently determine and warn of sudden decelerations. Thus, the system is not able to provide visual warning in the event of sudden decelerations by vehicle or external conditions other than braking or to continue to provide any such warning following an accident once the driver has released pressure on the brake pedal.

SUMMARY

In accordance with one aspect of the invention, there is provided a brake lamp module for a vehicle, wherein the module includes a housing, lamp device, sensor, and electronic control unit (ECU). The lamp device carried by the housing and has a lamp input for receiving operating power to illuminate the lamp device. The sensor is carried by the housing and has a sensor output. The ECU has a sensor input and power output, the sensor input being coupled to the sensor output, and the power output being coupled to the lamp input. The ECU is configured based at least in part on data received via the sensor input to provide a power signal on the power output to thereby cause illumination of the lamp device via the lamp input. In at least some embodiments, this arrangement permits actuation of the brake lamp or other lamp device in response to detection of a hazard event, such as rapid deceleration of the vehicle. And, in at least some embodiments, this may be done independently of actuation of the brake pedal by the driver.

Embodiments of this brake lamp module may include one or more of the following features, in any technical feasible combination.

The brake lamp module may include at least one additional sensor carried by the housing, with each additional sensor having a sensor output coupled to the ECU. And the power signal may be provided to the lamp device based upon communications from all the sensor outputs.

The sensor may be an accelerometer.

The ECU may be configured to provide the power signal to the lamp input independently of brake pedal actuation by a driver of the vehicle.

The ECU may be configured to detect a hazard event based at least in part on the data received via the sensor input and to provide the power signal in response to the detection of the hazard event.

The ECU may be connected to the lamp device such that the lamp device may be operated in response to either the power signal from the ECU or a separate brake pedal actuation signal inputted into the brake lamp module.

In accordance with another aspect of the invention, there is provided a method of illuminating a lamp device in a brake lamp module, including the steps of determining a hazard event at a vehicle in the absence of a brake pedal actuation alert from a brake pedal assembly, wherein the determination is based at least in part on an output of a sensor in the brake lamp module, and illuminating the lamp device in response to the determination.

Embodiments of this method may include one or more of the following features, in any technical feasible combination.

The illuminating step may be carried out using vehicle power coupled to the brake pedal assembly.

The illuminating step may include varying the brightness of the lamp device in a repeatable pattern.

The method can include the step of receiving the brake pedal actuation alert and operating the lamp device in response to the received brake pedal actuation alert independently of any determination of the hazard event.

BRIEF DESCRIPTION OF THE DRAWINGS

Preferred exemplary embodiments of the invention will hereinafter be described in conjunction with the appended drawings, wherein like designations denote like elements, and wherein:

FIG. 3 is a schematic view of the brake lamp module of FIG. 2; and

FIG. 4 is a flowchart illustrating one exemplary embodiment of a method using the brake lighting system.

DETAILED DESCRIPTION OF THE PREFERRED EMBODIMENTS

Figure 1:
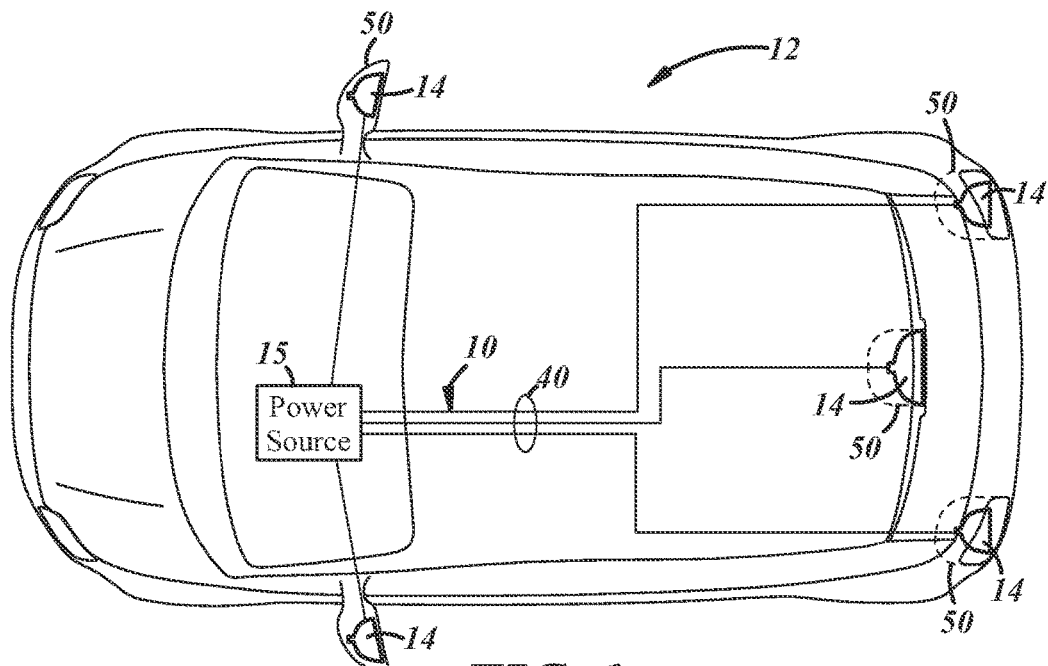
FIG. 1 is a top view of a vehicle having an exemplary vehicle brake lighting system.

Automotive vehicles have various brake lighting systems to give notice to and warn target drivers that an object driver is depressing the brakes. FIG. 1 illustrates a brake lighting system 10 in a vehicle or object vehicle 12 having multiple brake lamp modules 14 coupled to a power source 15. The brake lamp modules 14 may be located in various rearward- and/or sideward-facing regions of the vehicle such as in the taillight region, in the side mirror assemblies, and in rear-facing windows (e.g., carrying a CHMSL). The implementations described herein include a brake lighting system that may provide notice to and warn surrounding drivers of a deceleration event even when the vehicle's brake pedal is not depressed.

Figure 2:
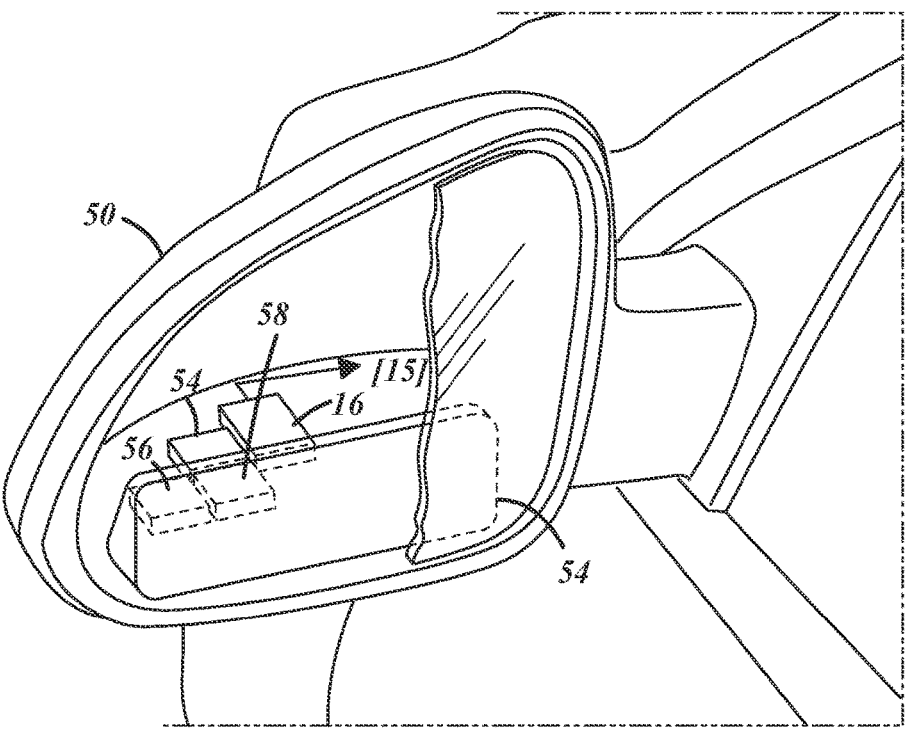
FIG. 2 is a perspective view of an exemplary brake lamp module.

A partial schematic of the brake lighting system 10 is shown in FIG. 3 illustrating one exemplary brake light module 14 (see also FIG. 2) having an electronic control module (ECU) 16. The system 10 further includes a brake pedal assembly 18 that includes a brake pedal 20, and the assembly 18 is coupled to the module 14 via power and/or control circuitry 40. As will be explained in greater detail below, both the brake light module 14 and the brake pedal assembly 18 may be separately coupled to vehicle power 15.

The brake pedal assembly 18 may include all electrical and mechanical components necessary to operatively apply the brakes in the vehicle 12. This may include the brake pedal 20 as well as a sensor 38 for detecting when the brake pedal is depressed or otherwise actuated. The brake pedal assembly 18 may have an output 70 for communicating a brake pedal actuation alert in response to actuation of the brake pedal (i.e., a pedal actuation event). While the output 70 may be suitable for coupling to a communication bus or other technology, in at least one implementation, the output may be connected to a power source PSI available to the pedal assembly 18 and providing a voltage (e.g., +12V or some other suitable voltage for illuminating one or more brake lamp modules 14). Brake pedal assemblies are generally known and therefore will not be described further. The circuitry 40 coupled to the brake pedal assembly 18 may be coupled to the output 70 and may include cables, wires, traces, or any other suitable means for conveying power and/or communication between the various electronic components and assemblies. All means for conveying power and/or control are contemplated (e.g., including electro-optical devices and wireless communication).

The power and control circuitry 40 may couple the brake pedal assembly 18 to the brake lamp module (BLM) 14 and the various BLMs 14 to the vehicle power source 15 (as shown in FIG. 1). The BLM 14 may include a housing 50 carrying the ECU 16, a lamp device 52, and at least one sensor 54. For illustrative purposes, FIG. 3 illustrates three sensors 54, 56, 58 although it will be appreciated that in some embodiments only a single sensor may be used. The housing 50 may include any container or structure for carrying the lamp device 52 and the sensors 54, 56, 58. Examples of the housing 50 include side mirror assemblies (FIG. 2) and taillight assemblies.

The lamp device 52 may include one or more light elements 60. The construction, assembly, and use of light element technology is known to skilled artisans; examples of light elements include incandescent light elements, fluorescent light elements, halogen light elements, light-emitting diode (LED) light elements, high-intensity discharge (HID) light elements, and any other suitable lighting technology. In FIG. 3, an input 72 of the lamp device 52 is coupled to the ECU 16 and the device 52 is also shown coupled to ground Gnd.

The sensors 54, 56, 58 may include any sensing or detecting element for determining or detecting vehicle motion, direction, and/or orientation or any changes to any of the foregoing. The sensors 54, 56, 58 are coupled to the ECU 16 via outputs 74, 76, 78, respectively. In addition, the sensors 54, 56, 58 may have inputs 82, 84, 86 (respectively) for receiving power via a power supply 87 in the ECU 16 (or from some other source in the vehicle). Examples of sensors include gyroscopes, accelerometers, vehicle speed sensors, vehicle direction sensors; however, other related or similar motion, direction, orientation sensors are also contemplated herein. The first sensor 54 may be an accelerometer. Optional sensors 56, 58 may be single-axis gyroscopes. Or for example, sensors 54, 56, 58 may all be accelerometers—e.g., oriented to receive data in each of the X, Y, and Z directions (according to a Cartesian coordinate system). Some implementations may have less or more sensors; therefore, the illustrated sensors 54, 56, 58 are only exemplary.

In instances where sensor 54 is an accelerometer, it may be tuned to or designed according to a predetermined threshold or sensitivity. Or the accelerometer 54 may be selected for the BLM 14 based on its sensitivity (e.g., according to its specifications). The selected threshold may be correlated to or associated with a hazard event such as a vehicle collision or loss of vehicle control; i.e., the accelerometer may be selected such that if its threshold is reached or exceeded, it is likely the vehicle is experiencing a hazard event. For example, some 10 G accelerometers may not provide a hazard alert (e.g., digital, analog, or other suitable output) unless the accelerometer experiences 10 Gs (i.e., 1 G or gravitational unit being a single unit of acceleration or approximately 9.81 meters/second/second). Other accelerometers may provide a hazard alert in relation to the magnitude of the acceleration or deceleration experienced. For example, if the accelerometer experiences 5 Gs, the hazard alert may be associated with a 5 G value (e.g., a 5V signal), or if the accelerometer experiences 4 Gs, the hazard alert may be associated with a 4 G value (e.g., a 4V signal), etc. And in some instances, the accelerometer's output may be a combination of the two; e.g., a 3 G accelerometer may provide a proportional output for all experienced accelerations greater than or equal to 3 Gs. Here, the examples of 3 Gs, 4 Gs, and 5 Gs are merely exemplary and the associated outputs may or may not be linear. In all instances of hazard alerts, the alert may be communicated via the output 74 (or, e.g., via outputs 76, 78 for sensors 56, 58, respectively).

As used herein, the term hazard event may be broadly construed to include any dangerous or potentially dangerous event experienced by the vehicle and detectable using motion sensors such as sensors 54, 56, 58. For example, if the vehicle 12 rapidly slows down effecting a hazard alert from the accelerometer 54, the ECU 16 may assume that the vehicle collided with another vehicle or object. Or for example, if the vehicle swerves from right to left (or vice versa) and actuates a sensor such as an accelerometer or gyroscope, the ECU may assume that the driver of the vehicle has fallen asleep or otherwise lost control of the vehicle. Or for example, if the vehicle experiences a large upward/downward vibration and actuates a vertically oriented accelerometer 54, the ECU 16 may assume that the vehicle has drifted out of its lane and across roadside rumble strips.

The ECU 16 within the BLM 14 may include various processors, memory, ECU circuitry, and optionally a power supply. For example, it may have one or more processors 30 (e.g., processing units, controllers, microprocessors, microcontrollers, discrete logic circuit(s)) having logic gates for implementing logic functions on data signals, application specific integrated circuits (ASIC) with suitable logic gates, complex programmable logic devices (CPLD), programmable or field-programmable gate arrays (PGA/FPGA), and/or the like. The ECU also may have one or more memory devices or computer readable media 32 operatively coupled to the processor(s) 30 via ECU circuitry 88. In other embodiments, ECU 16 may be implemented in a simple analog circuit that switches power or pulses of power to the lamp device 52 when a suitable sensor input is received. In addition, the circuitry 88 may include coupling the sensor inputs 82, 84, 86 to a power supply 87. The power supply 87 may be auxiliary vehicle power, or in one implementation, the power supply 87 may be a capacitive or other storage device providing temporary power in the absence of vehicle power (e.g., lighting the lamp device 52 via input 80 or powering the sensors in the absence of a braking pedal actuation event). The storage device may be recharged from the power supplied to the assembly during brake pedal actuation as indicated by the dashed line in FIG. 3. In one embodiment, provided here only by way of example, the circuitry 88 may include a lamp driver circuit 90 providing vehicle power to the lamp device 52 without interaction of the brake pedal assembly.

The lamp driver circuit 90 may include discrete and/or integrated components; here, the lamp driver circuit is merely illustrative and is shown as a transistor circuit T1 having a gate G, an input I for receiving a power source, and an output O for delivering or providing power. The transistor circuit T1 may include various passive and active analog components and/or various suitable digital components and may include cables, wires, traces, etc. The circuit T1 may be arranged to receive power (e.g., a voltage or current) at the input I and then based upon the inputs at the gate G, deliver power (e.g., a voltage or current) at the output O. The value or magnitude of the output O may or may not be the same as the input I; furthermore, the input I may receive a voltage and the output O may provide a current, or vice-versa. The lamp driver circuit 90 and the power and/or control circuitry 40 from the brake pedal assembly 18 may both be coupled to the lamp device 52 via a pair of diodes D1 and D2. This OR-tied design allows activation of the lamp device by either pedal actuation or by ECU 16 based on the sensor input. This has the advantage that the lamp can be illuminated by operation of the brake pedal assembly even if the ECU fails or becomes disconnected. Diodes D1 and D2 are coupled to a node N. The node N couples the diode D2 which is coupled to the output O of the transistor circuit T1 to the input 72 of the lamp device 52. The input I of the transistor circuit T1 is coupled to a power source PS2 (e.g., shown here as +12V vehicle power; however other values may be used). The gate G of the transistor circuit T1 is coupled to the output 74 of the sensor 54. In some implementations, the outputs 76, 78 of the sensors 56, 58 may also be coupled to the transistor circuit T1. It should be appreciated that the lamp driver circuit 90 could also be located elsewhere in the BLM 14, in part or in its entirety.

In one mode of operation, the sensor 38 may be activated based upon a pedal actuation event from the brake pedal 20. In the illustrated example, a pedal actuation alert may be provided at the output 70 of the sensor 38 providing a voltage in response to the occurrence of a pedal actuation event (e.g., the +12V voltage). Power may thus be communicated through the circuitry 40 to the BLM 14 and into the lamp driver circuit 90 entering via the diode D1. Since the diode D2 may prevent reverse current flow, the power may be delivered through node N and to the lamp device input 72 thereby illuminating the lamp device 52 when a vehicle driver depresses the brake pedal.

However in another mode of operation, if the sensor 54, the sensor 56, the sensor 58, or any combination of the sensors detect a hazard event and provide a hazard alert, the voltage received at the gate G may be sufficient to actuate or activate the transistor circuit T1. When the transistor circuit T1 is actuated, power or a power signal from PS2 may be delivered through the transistor circuit 90 (e.g., into input I and out of output O) to the diode D2, the node N and to the input 72 of the lamp device 52 thereby illuminating the light elements 60. Therefore, in at least one implementation, the lamp device 52 may be illuminated in the absence of or without a pedal actuation event or the brake pedal 20 being depressed.

A method 400 of operation for the present system is illustrated in FIG. 4. The method begins at step 410 where a hazard alert may be received by the ECU from at least one sensor in the BLM 14. The alert may be any form of communication from the sensor to the ECU including digital or analog signaling; as previously described, this may include a voltage having a predetermined threshold value. In step 420, it may be determined whether the lamp driver circuit 90 should be actuated. This may occur during or in the absence of a brake pedal actuation alert. This was previously illustrated using a transistor circuit; i.e., the transistor circuit logically determined whether it should be actuated based upon the gate G voltage; i.e., in the illustrated implementation, actuation occurred when the voltage at the gate G was equal to or greater than a predetermined threshold voltage according to the design of the circuit T1. And this determination may be accomplished by the ECU in numerous ways, including other logic circuitry, software, firmware, etc. If the lamp driver circuit is not actuated, the method returns to step 410 and begins again; however, if it is determined that the lamp driver circuit 90 should be actuated, the method proceeds to step 430. And at step 430, power is provided to the lamp device 52—e.g., via a power signal from the ECU. This power signal may include vehicle power (e.g., from PS2) or it may be powered at least temporarily via the ECU's optional power supply 87. After the lamp is illuminated, the method 400 concludes.

It should be appreciated that the method 400 contemplates a scenario in which the sensors are actuated simultaneous to the brake pedal 20 being depressed. Thus, in one implementation of the method 400, the lamp device 52 may still illuminate as power is provided by both the circuitry 40 and the lamp driver circuit 90. And in another implementation, the ECU 16 may include circuitry, software, etc. to sense or detect a brake pedal actuation alert or signal and may cancel or block activation of the lamp via the ECU 16. Therefore, the sensor(s) 54, 56, 58 may provide a hazard alert(s) and the brake pedal assembly 18 may provide a pedal actuation alert contemporaneously and the lamp device 52 will illuminate.

The previously described embodiment has been illustrated with discrete analog components and circuitry; however, it should be appreciated that a similar system may designed using the processor 30 and memory 32. In addition, control systems within the ECU 16 may be tuned to intelligently predict various hazard events. For example, the ECU may be tuned or adjusted according to various environmental factors including the size, weight, center of gravity, etc. of the vehicle. And some ECUs 16 may be SMART systems capable of learning the characteristics and habits of individual drivers.

Additional embodiments may include the manner in which the lamp device illuminates; e.g., the illumination may be tailored to the type of hazard event detected. For example, the illumination may include turning the light elements 60 ON and OFF according to a pattern or predetermined frequency. Or the brightness of the light elements 60 may be increased or decreased or the color may be changed according to the type of hazard. Or the ECU 16 may control the light elements 60 independently to create any suitable illumination display or sequence. The processor 30 may control the power signal delivered to the lamp device 52 or its individual light elements to accomplish these various illumination sequences, and the memory devices 32 may store these sequences therein. Thus, the various illumination embodiments may be implemented during a hazard event or based upon a hazard alert. For example, in a scenario where a collision is sensed, the ECU 16 may command a flashing sequence at a greater than normal brightness. Or for example, if the hazard alert indicates the vehicle is swerving, the lights may illuminate ON and OFF with a rapid frequency, or change color, etc.

The presently described system enables a modular assembly to be delivered by an original equipment manufacturer (OEM) to an automotive manufacturer. By installing such modules on their vehicles manufacturers limit vehicle design and integration time and costs. This is particularly true since no additional or extra-modular circuitry may be required except in some instances power. But of course, as previously explained, the modular assembly described herein may not always require power either.

Furthermore, the system and the method described above or parts thereof may be implemented using a computer program product may include instructions carried on a computer readable medium for use by one or more processors of one or more computers (e.g., within the ECU 16) to implement one or more of the method steps. The computer program product may include one or more software programs (or applications) comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory 32, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A brake lamp module for a vehicle, comprising:
a housing;
a lamp device mounted within the housing and having a lamp input for receiving operating power that illuminates the lamp device;
a first circuitry mounted within the housing and having a first diode, wherein the first circuitry is coupled between a brake pedal assembly and the lamp device and is arranged so that, in response to activation of a brake pedal, operating power is provided from the brake pedal assembly, through the first circuitry, to the lamp input;
a sensor in the form of an accelerometer mounted within the housing and having a sensor output that provides a hazard alert signal in the event of a hazard event;
an electronic control unit (ECU) mounted within the housing and having a sensor input coupled to the sensor output and a lamp driver circuit, wherein the first circuitry neither passes through the ECU nor is controlled by the ECU; and
a second circuitry mounted within the housing and having a second diode, wherein the second circuitry is coupled between the ECU and the lamp device and is arranged so that, in response to the hazard alert signal from the sensor, operating power is provided from the ECU, through the second circuitry, to the lamp input;
wherein the lamp device, at least part of the first circuitry, the sensor, the ECU, and the second circuitry are all packaged within the housing so as to constitute a single module that, in response to activation of a brake pedal, operates in a first mode and illuminates the lamp independent of a state of the sensor and that, in response to the hazard alert signal, operates in a second mode and illuminates the lamp independent of a state of the brake pedal assembly, wherein the first circuitry is configured such that when the ECU fails or becomes disconnected, the first circuitry will still allow operation of the lamp device mounted within the housing.

2. The brake lamp module of claim 1, further comprising at least one additional sensor carried within the housing, wherein each additional sensor has a sensor output coupled to the at least one sensor input of the ECU, wherein, in response to receiving the hazard alert signal from the sensor or from the at least one additional sensor, the single module operates in the second mode and illuminates the lamp device independent of the state of the brake pedal assembly.

3. A method of illuminating a lamp device in a brake lamp module for a vehicle, comprising the steps of:
receiving sensor data at an electronic control unit (ECU) from a sensor; and
in response to receiving the sensor data, determining within the brake lamp module whether a collision event has occurred, wherein, when the ECU determines no occurrence of the collision event, then actuating the lamp device without using the ECU so that a brake pedal actuation signal received from a brake pedal assembly in the vehicle may illuminate the lamp device on and off via operating power provided from the brake pedal assembly through a first circuitry coupled between the brake pedal assembly and the lamp device, wherein the first circuitry is separate from the ECU, and wherein, when the ECU determines an occurrence of the collision event, then actuating the lamp device using the ECU via operating power provided from the ECU through a second circuitry coupled between the ECU and the lamp device, wherein the actuation illuminates the lamp device according to a predetermined flashing sequence, wherein the lamp device, the ECU, at least a portion of the first circuitry, at least a portion of the second circuitry, and the sensor are all packaged within a housing so as to constitute a single module, and wherein the first circuitry is configured such that when the ECU fails or becomes disconnected, the first circuitry will still allow operation of the lamp device packaged within the housing.

4. The method of claim 3, wherein actuating using the ECU is carried out using vehicle power coupled to the brake pedal assembly.

5. The method of claim 3, wherein actuating using the ECU includes varying the brightness of the lamp device according to a repeatable pattern.

6. The method of claim 3, wherein the predetermined flashing sequence illuminates the lamp device for a predetermined period of time.

7. A brake lamp module for a vehicle, comprising:
a housing;
a stop lamp device carried by the housing which is electrically coupled to a vehicle brake pedal assembly;
a sensor carried by the housing; and
a control circuit that includes an electronic control unit (ECU) and that is carried by the housing being coupled to the stop lamp device and the sensor, the control circuit configured to execute instructions that include:
in a first mode, permitting electrical data to pass from the brake pedal assembly to the stop lamp device via a first uni-directional path to thereby illuminate the stop lamp on and off according to a brake actuation input, wherein the first uni-directional path does not pass through the ECU, wherein the ECU does not control the electrical data sent via the first uni-directional path; and
in a second mode:
controlling illumination of the stop lamp device via the ECU of the control circuit in response to receiving a hazard alert signal from a sensor output of the sensor at a sensor input the control circuit;
wherein, in response to receiving the hazard alert signal at the control circuit, transmitting electrical data from the control circuit to the stop lamp device via a second uni-directional path to actuate the stop lamp device according to a predetermined pattern,
wherein the first and second uni-directional paths are coupled at a node, wherein first portions of the first and second uni-directional paths are different from one another, wherein the first portion of the first uni-directional path has a different configuration than the first portion of the second uni-directional path, wherein second portions of the first and second uni-directional paths are the same as one another and extend between the node and the stop lamp device,
wherein the stop lamp device, the sensor, the control circuit, and the second portions of the first and second uni-directional paths are all packaged within the housing so as to constitute a single module.

8. The brake lamp module of claim 7, wherein the housing comprises one of a vehicle tail-light housing, a vehicle center high-mounted stop lamp (CHMSL) housing, or a side-view mirror housing.

9. The brake lamp module of claim 8, wherein the housing is the CHMSL housing.

10. The brake lamp module of claim 7, wherein the control circuit is configured to determine the collision event without receiving electrical input from the brake pedal assembly.

11. The brake lamp module of claim 7, wherein the first uni-directional path and the second uni-directional path each include a diode to direct current flow from the brake pedal assembly to the stop lamp device and from the control circuit to the stop lamp device, respectively.

* * * * *